United States Patent
Hockman

(10) Patent No.: US 8,065,838 B2
(45) Date of Patent: *Nov. 29, 2011

(54) SYSTEM FOR MOUNTING

(76) Inventor: Mark Hockman, Westtown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/482,886

(22) Filed: Jun. 11, 2009

(65) Prior Publication Data
US 2010/0083588 A1 Apr. 8, 2010

Related U.S. Application Data

(63) Continuation-in-part of application No. 11/487,588, filed on Jul. 17, 2006, now Pat. No. 7,549,253.

(60) Provisional application No. 60/700,344, filed on Jul. 19, 2005.

(51) Int. Cl.
 *E04D 13/10* (2006.01)
(52) U.S. Cl. ............................................... 52/25; 52/24
(58) Field of Classification Search .............. 52/24, 25, 52/26, 41, 42, 44, 173.3; 182/45; 248/148, 248/237

See application file for complete search history.

(56) References Cited

U.S. PATENT DOCUMENTS

| | | | | |
|---|---|---|---|---|
| 1,054,091 | A * | 2/1913 | Darnall | 248/237 |
| 5,409,549 | A * | 4/1995 | Mori | 136/244 |
| 5,609,326 | A * | 3/1997 | Stearns et al. | 256/12.5 |
| 6,357,184 | B1 * | 3/2002 | Alley | 52/25 |
| 6,453,623 | B1 * | 9/2002 | Nelson et al. | 52/24 |
| 6,718,718 | B2 * | 4/2004 | Haddock | 52/545 |
| 6,834,466 | B2 * | 12/2004 | Trevorrow et al. | 52/24 |
| 7,758,011 | B2 * | 7/2010 | Haddock | 248/500 |
| 7,814,899 | B1 * | 10/2010 | Port | 126/623 |

* cited by examiner

*Primary Examiner* — Robert Canfield
*Assistant Examiner* — Christine T Cajilig
(74) *Attorney, Agent, or Firm* — Stites & Harbison PLLC; Douglas E. Jackson

(57) ABSTRACT

A mounting and attachment system, which mounts a continuous snow rail for snow protection above the seams of a metal roof and also attaches lower members or snow flags between the seams to stop the snow from sliding under the seam. This system reduces the requirement for holes and threaded holes in the mounting block. The mounting block has a slot which runs therethrough to fit over a raised seam. This slot can have parallel walls or can be shaped to match a particular seam. This block also has slots or linear indentations on the sides or ends in a direction perpendicular or parallel to the slot for the seam. A snow rail long enough to connect two or more of the seam-mounted blocks together. Finally, a top rail may be secured parallel to the seam and mounted on two or more seam mounted blocks.

14 Claims, 7 Drawing Sheets

SYSTEM FOR MOUNTING

REFERENCE TO PRIOR APPLICATION

This application claims the benefit of the filing date of applicant's Provisional Patent Application No. 60/700,344, filed Jul. 19, 2005, and is a continuation-in-part of application Ser. No. 11/487,588, filed Jul. 17, 2006 and now U.S. Pat. No. 7,549,253.

BACKGROUND OF THE INVENTION

The invention relates to a non-penetrating system for mounting other devices (e.g. accessories) and snow brake systems for metal roofs with raised metal seams.

Mounting attachments and snow protection systems to metal roofs have always created problems for either the method of attachment or by the function of the finished application. The following system overcomes many problems and can be installed in an endless variety of configurations.

The present invention provides a method of attaching specially shaped mounting blocks to a raised metal seam without penetrating said seam while providing an adaptable shape for a number of different functions.

One aspect of the present invention uses an improved mounting and attachment system, which can easily be mounted. The present invention uses an improved mounting and attachment system, which can easily mount continuous snow rail for snow protection above the seam and also attach lower members or snow flags which fall between the seams to stop the snow from sliding under the height of the seam. This system eliminates the requirement for holes and threaded holes to be drilled into the mounting block, saving manufacturing time and money. The mounting block is configured so that there is a slot which runs through the mounting block to fit over a raised seam. This slot can have parallel walls or can be shaped to match the form of a particular seam. This block will also have slots or linear indentations on the sides of the block in directions perpendicular and parallel to the slot for the seam. These slots or indentations can be of any shape and are not limited to the designs as shown in the drawings as long as they run the length of the block. A second piece of the assembly is a rail long enough to connect two or more of the seam-mounted blocks together. The bottom of the second piece has a groove on either side which will match the groove in the mounting block, thus being of a design to slide onto the mounting block and, at the same time, align the blocks and attach to the mounting blocks without fasteners. The shape of the top rail can have a raised portion that will act as a snow rail or snow bar. This system eliminates bolts and holes generally associated with the assembly of this type of system. Another aspect of the invention utilizes the slot that mounts the rail to the mounting blocks for mounting snow protection sections (e.g., snow flags) between the raised metal seams below the upper rail. These sections can be installed by sliding them between the seam mounting blocks during installation. This design gives flexibility in the design and installation of the snow rail system while also allows for other shapes of rail to be mounted on the attachment blocks for different purposes. This continuous rail adds strength to the system, covers the area between the seams and easily installs giving it many advantages over the prior art.

According to one embodiment, the present invention may be used to attach solar panels to a roof comprising standing seams or other elements.

Still further, according to another embodiment, the present invention uses a mounting block that is configured to include a support means such as a planar base that is designed to attach to the surface of a roof or other support portion of a building or the like.

Other advantages will be apparent to those skilled in the art.

DETAILED DESCRIPTION

Figure 1:
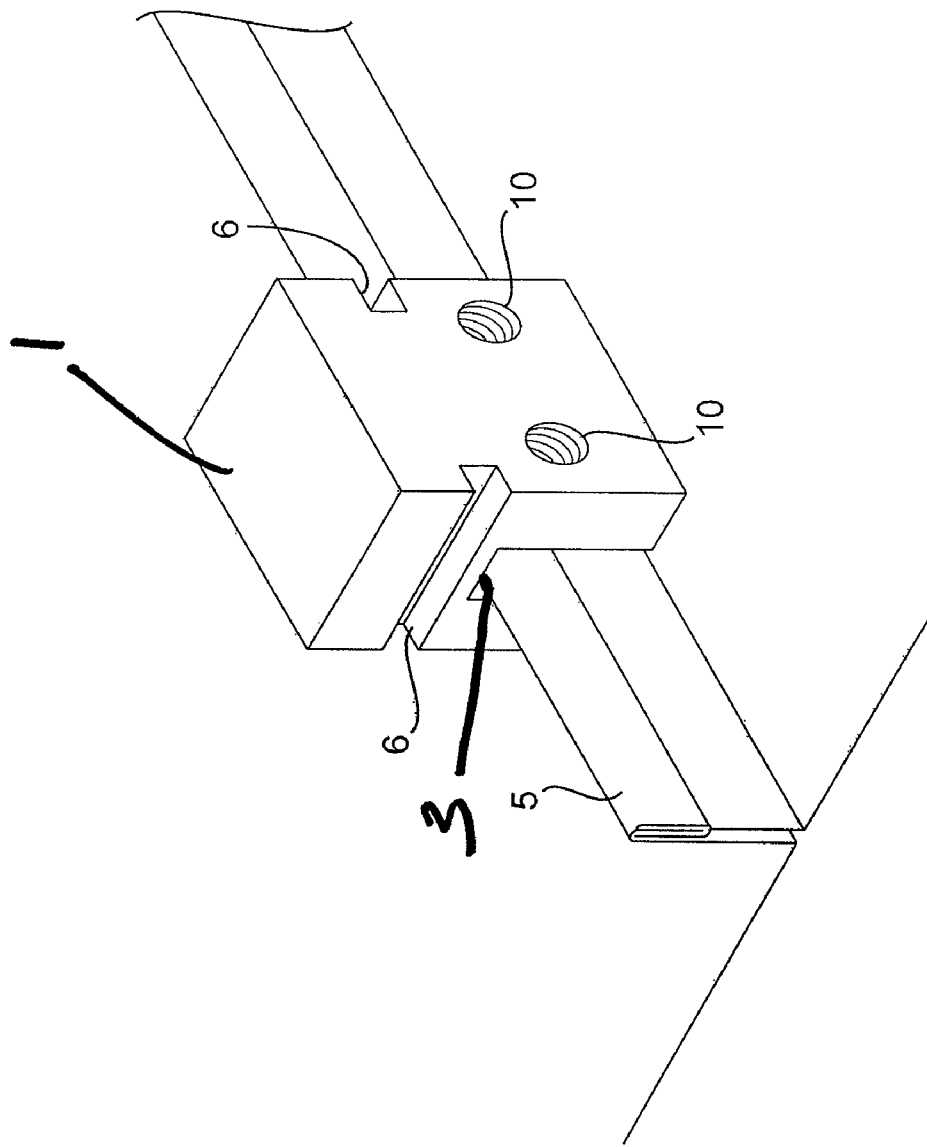
FIG. 1 is a perspective view of the mounting block shown on a raised roof seam, showing the orientation of the seam to the accessory mounting block slots or linear indentations.
Figure 6:
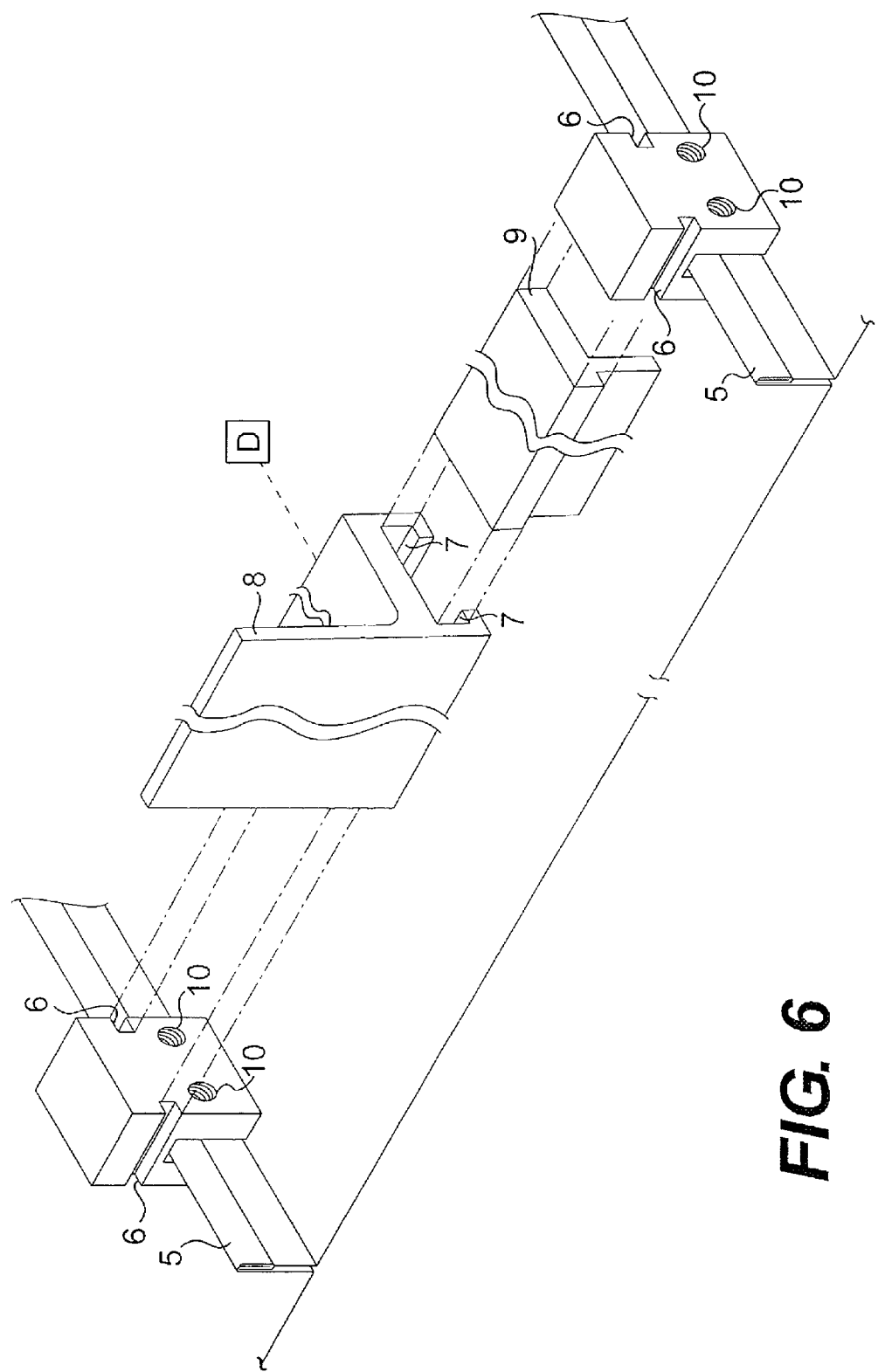
FIG. 6 is an exploded view of a mounting block, snow flag and top snow rail or snow bar.

Referring now to FIG. 1, it is a perspective view of the mounting block 1 in the installed position with slot 3 installed over the metal roof raised seam 5. As illustrated in FIG. 6, the system is composed of three main components, the mounting block 1, the top snow rail 8 and the bottom rail or snow flag 9. Mounting block 1 contains slots or linear depressions 6 running the length of the mounting block 1 perpendicular to the raised seam 5 and mounting slots 3 and 4.

The mounting slots 3 and 4 can be produced in a variety if linear shapes to fit and function on various metal seam profiles. The two threaded holes 10 can be on one side of mounting block 1 or opposing each other on both sides of mounting block 1 depending on the seam application. Threaded holes for fasteners 10 are generally used with fasteners such as set screws made of stainless steel and are tightened using an Allen or hex type fastener to attach mounting block 1 to raised seam 5. Screws can be opposing, have depressions for screws to force seam material into, or have noses of any shape.

Figure 2:
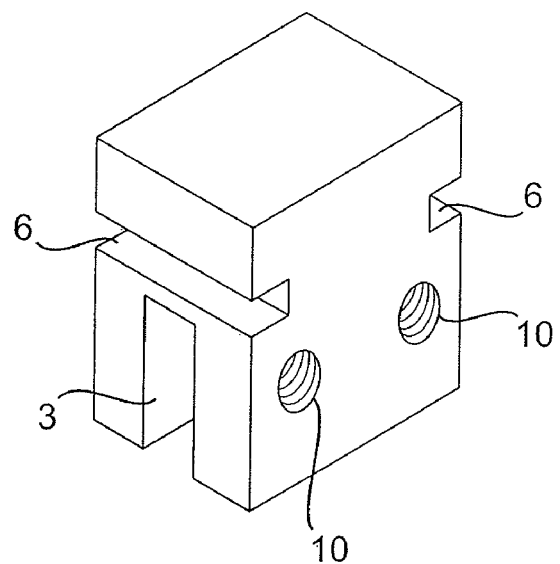
FIG. 2 is a perspective drawing of the mounting block showing the mounting slots or groove and the set screw holes for affixing to the raised seam.
Figure 3:
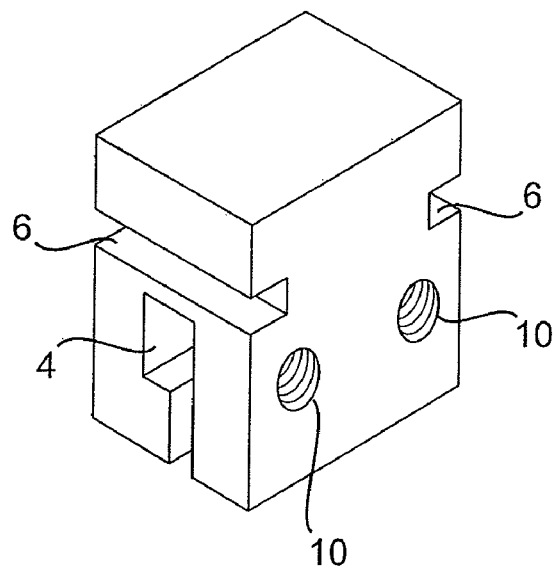
FIG. 3 is a perspective drawing of the mounting block showing a variation of the seam mounting slot. The mounting slot can be configured in different shapes for different roof seam profiles.

FIGS. 2 and 3 illustrate possible shapes for the opening slot 3 and 4. Since there are many different raised seam shapes, the shape of the slot 3 and 4 will be determined by the shape of the profile to which it will be attached. FIGS. 2 and 3 are substantially the same with regard to everything with the exception of the mounting slots 3 and 4. The mounting screw holes 10 and the top snow rail mounting groove remain similar in dimensions.

Figure 4:
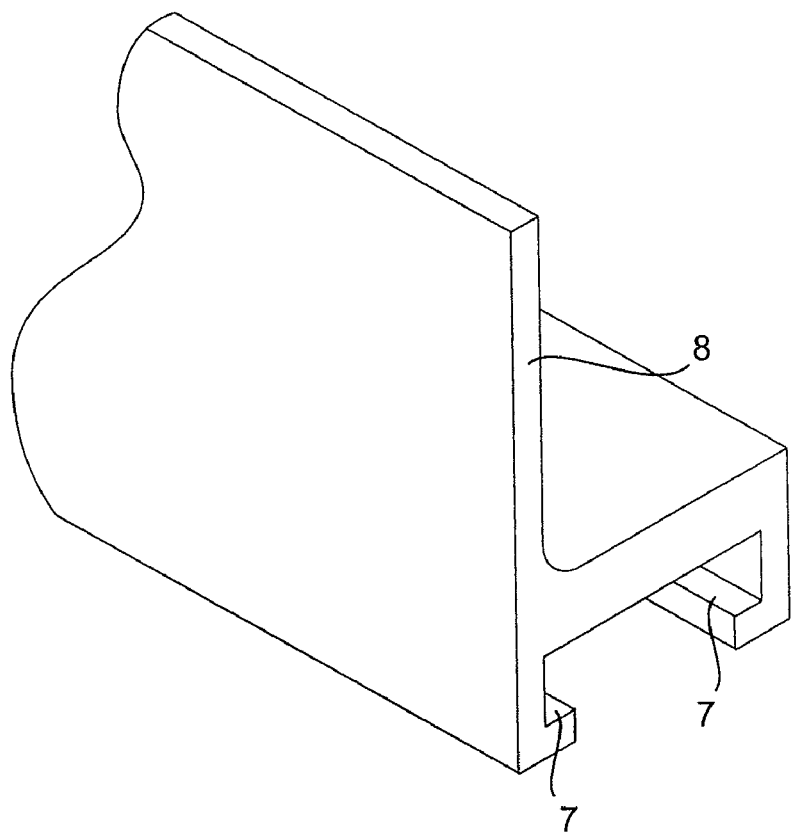
FIG. 4 is a drawing of top rail or snow rail which contains linear indentations which match the shape of the mounting block slots and slide together affixing the top rail to the two or more mounting blocks.

FIG. 4 illustrates the top snow rail 8 with slot 7 for attachment over groove 6 in mounting block 1. Top snow rail 8 will connect two or any number of mounting blocks 1 affixed to any number of parallel raised seams. When installed, the top snow rail portion 8 extends horizontally across the roof perpendicular to the raised seams.

Figure 5:
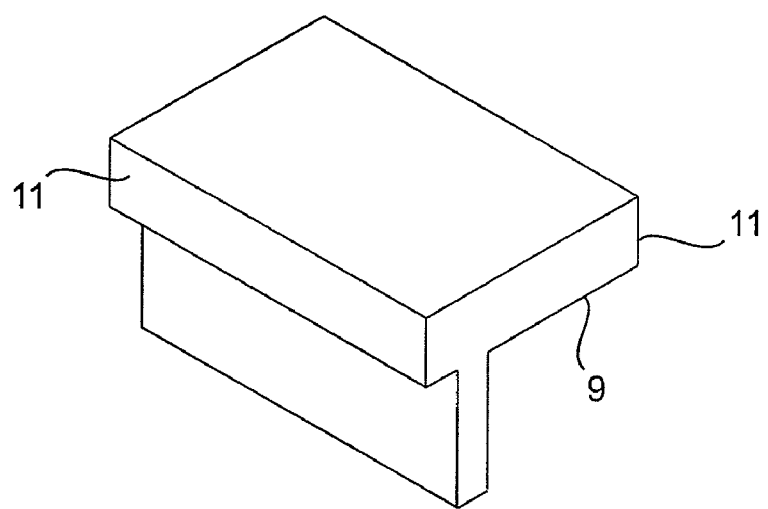
FIG. 5 is a drawing of the bottom rail or snow flag showing the downward extending continuous flag portion that extends between and below the raised seams, while installed by having flanges or extensions on the top surface that fit into the bottom of the top rail slots holding it firmly.

FIG. 5 is a perspective drawing of the bottom rail or snow flag 9. The snow flag 9 performs a number of functions when installed with the top snow rail 8. It is designed to extend below and between the raised seams 5 of a metal roof. Many prior art designs do not extend below the seam height 5 due to the attachment design. The bottom rail depicted may take many forms and can include holes and threaded openings or the like for attachment of other devices (e.g., a support bracket for a solar panel).

Snow flag 9 is constructed with a horizontal surface across the top of the length of the piece with the outward edges 11 being the same thickness on each side. The thickness and dimensions of snow flag 9 is designed to slide into the groove 7 of top snow rail 8.

Figure 9:
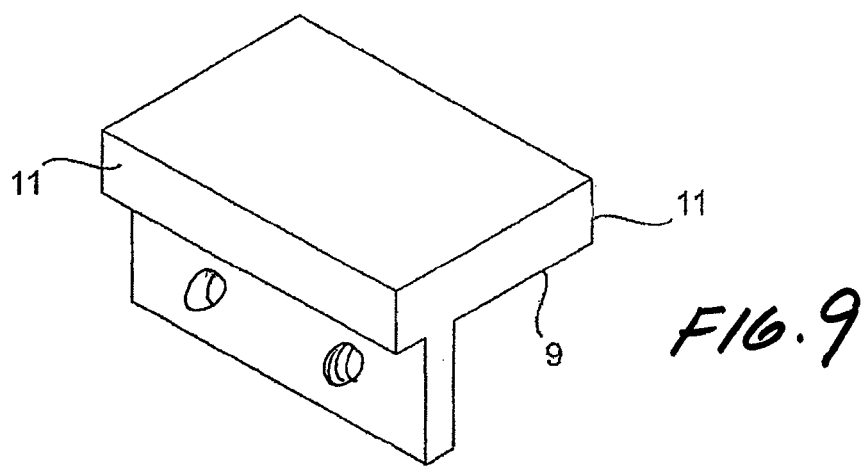
FIG. 9 shows a bottom rail with openings.

While top snow rail 8 can be continuous, thereby spanning more than one raised seam 5, bottom snow flag 9 is designed to be installed in sections between raised seams 5, thereby providing for snow protection below the raised seams 5. Snow flag 9, when installed in conjunction with top snow bar 8, will add strength to the system. When installed, snow flag's 9 top flanges 11 will slide into grooves 7 defined in top snow rail 8. This will anchor the bottom snow flag 9 and add strength to the entire assembly. This will give additional strength to top snow rail 8 for additional snow protection or use as a mounting plate for other roof attachments (e.g., signs, antennae, scaffold, solar panels). FIG. 9 shows a bottom rail with openings to allow for attachment of other devices (e.g., brackets, solar panels).

As best seen in FIG. 6, the mounting block is provided with grooves 6 on its end surfaces. The grooves 6 form a "T"-shaped cross section above the uppermost part of seam-receiving groove 3. Also, as seen in FIG. 6, the top snow rail 8 defines a longitudinal groove 7 that has a "C"-shaped cross section that can be slid over the T-shaped cross section of the mounting block and the upper T-shaped cross section of snow flag element 9.

Figure 7:
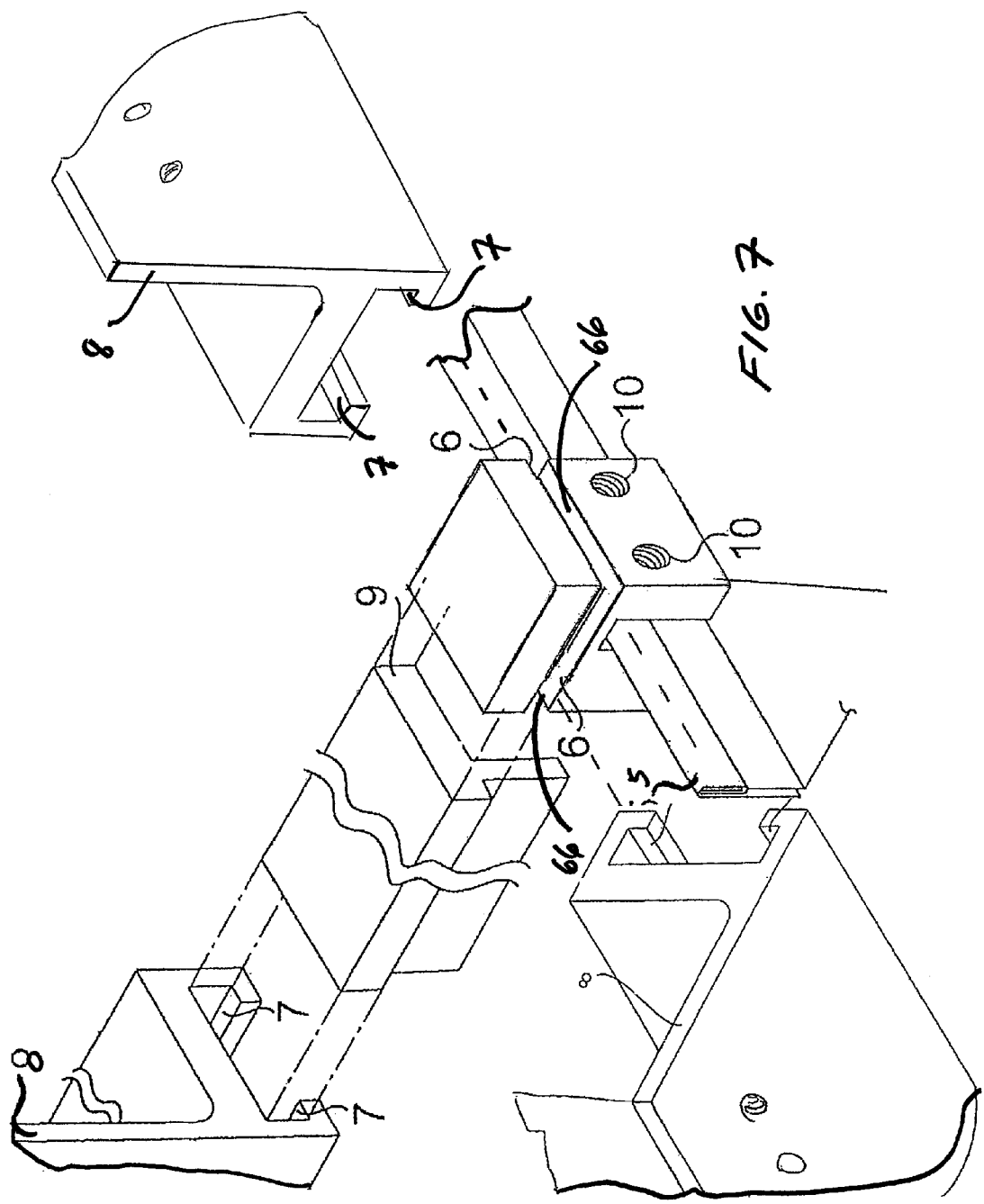
FIG. 7 is an exploded perspective view to show a mounting block assembly according to one aspect of the invention.

As best seen in FIG. 7, the mounting block is provided with grooves 6 on its end surfaces and grooves 66 on its side surfaces. The grooves 6 and 66 are shown as coplanar to each other and parallel to the top surface of the mounting block. The use of grooves 66 form a "T"-shaped cross section above the uppermost part of the seam-receiving groove 3. Also, as shown in FIG. 7, the top rail 8 defines longitudinal grooves 7, 7 that each have a "C"-shaped cross-section that can be slid over the T-shaped cross section of the mounting block. If desired, two contiguous mounting blocks on a seam can form the support for perpendicular top rails. Also, the corner mounting blocks can be formed as an integral structure having a L-shaped plan view when viewed from above.

Figure 8:
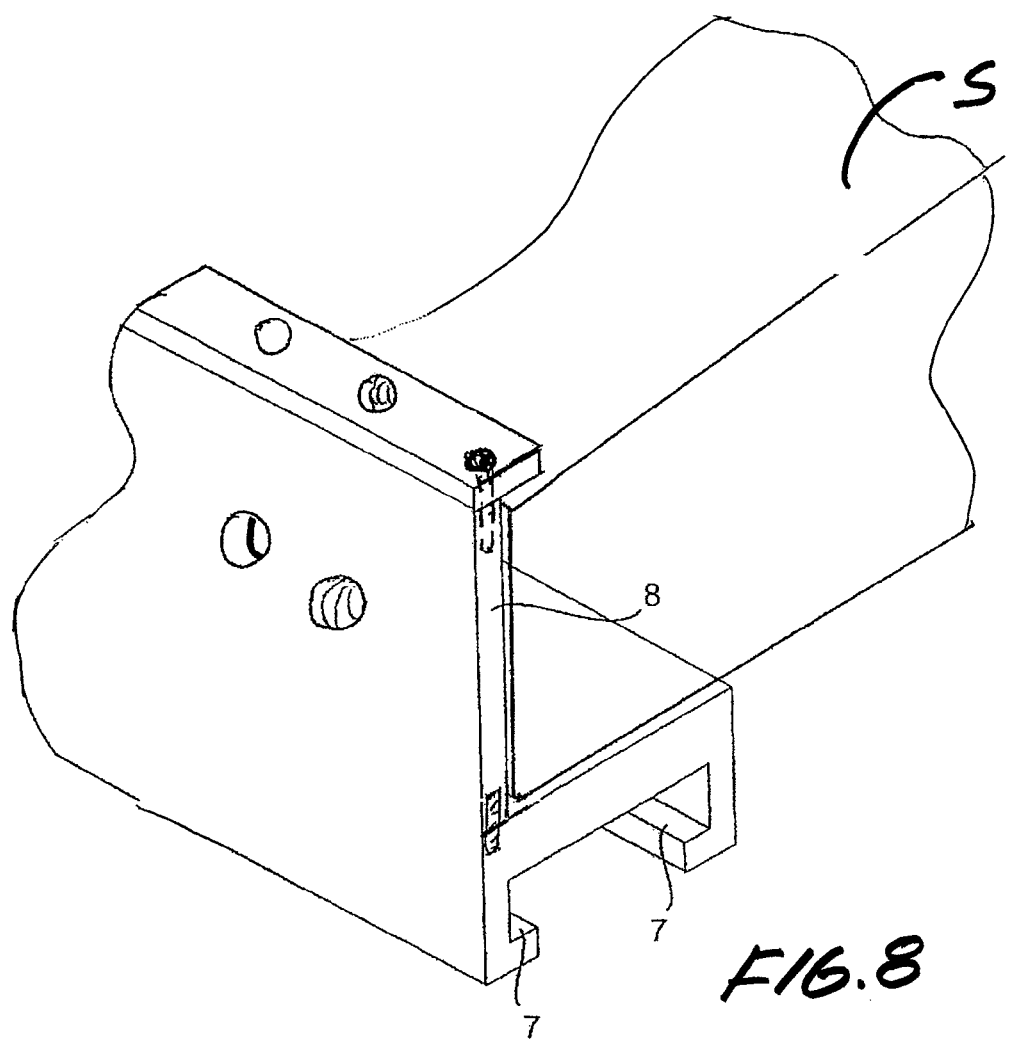
FIG. 8 is a drawing of a top rail according to another embodiment of the invention.

FIG. 8 illustrates a top rail 8 with slot 7. Top rail 8 may be of any form so long as the slot 7 matches the mounting block. The top rail 8 may be mounted perpendicular to raised seams or parallel to them. Top rail 8 may be made of one or more sections which assemble for mounting applications using through or threaded holes formed in the top rail. As shown in FIG. 8, the top rail 8 may have a detachable holding means bolted to the top edge of the rail to be used to secure the edge of another device such as a solar panel S.

Figure 10:
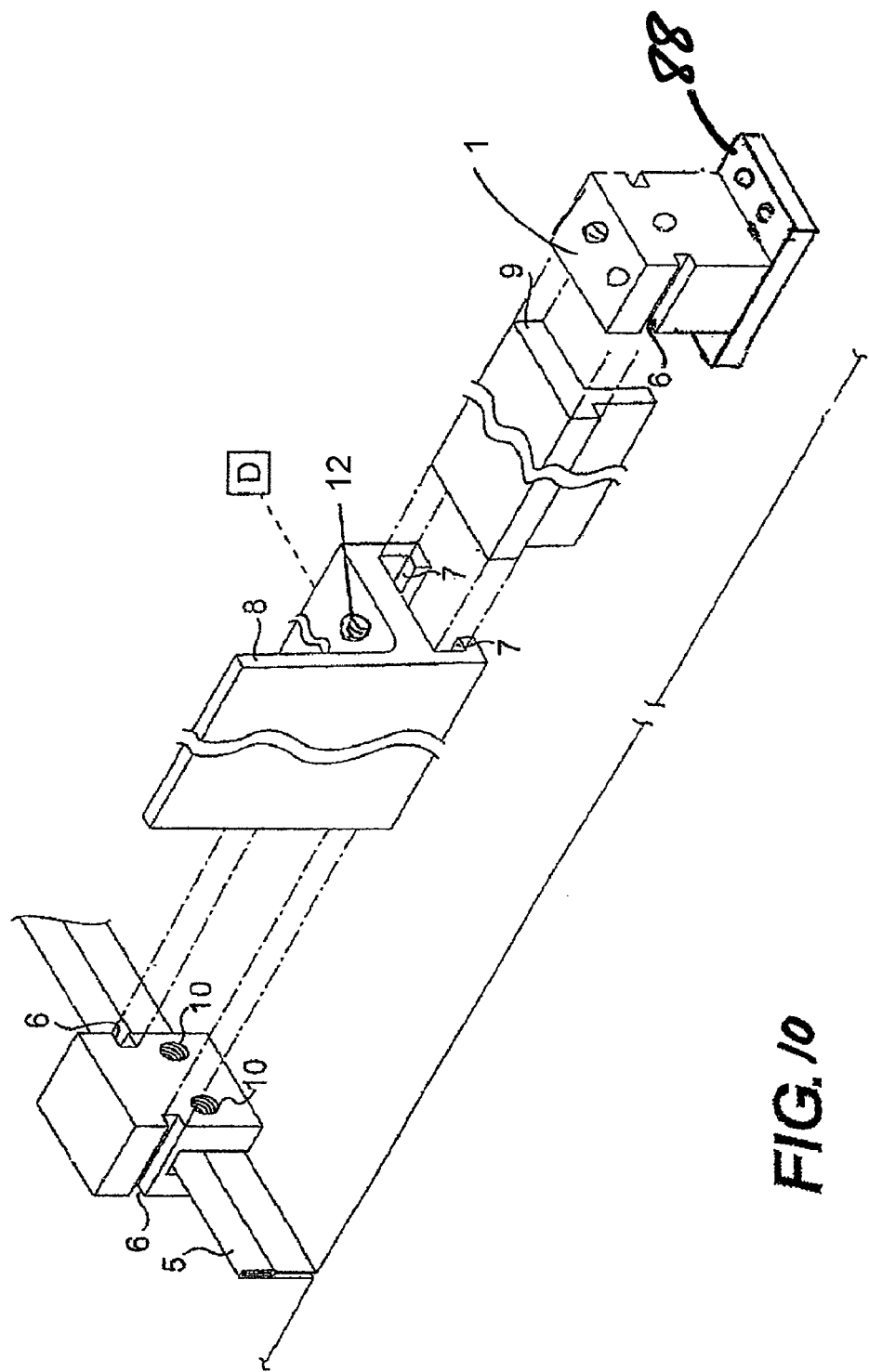
FIG. 10 is a drawing of an embodiment of a mounting block with support means for attachment to a surface which does not have raised seams.

FIG. 10 shows a system wherein the mounting block has a support base means 88 for attaching the mounting block to a support structure such as a roof panel. The base 88 includes holes to allow for fasteners (not shown) to be driven into the support structure. As illustrated in FIG. 10, the top rail may be provided with a set screw and threaded hole 12 so that the top rail can be held securely in place on the top of the block by the lower end of the set screw.

It can be appreciated from the foregoing description and various embodiments provided that numerous changes or modifications may be made without departing from the spirit or the scope of the invention as defined by the following claims. Although certain preferred embodiments are presented for the purpose of describing the present invention, other species or deviations from the specific embodiments of the invention are to be considered within the scope of the invention.

I claim:

1. A snow brake and mounting system for metal roofs with parallel raised metal seams, said system having:
   a first mounting block attached to a first raised metal seam,
   a second mounting block attached to a second raised metal seam located in a spaced relationship to said first seam,
   a snow rail with one portion connected to said first mounting block and another portion connected to said second mounting block, the improvement wherein:
   said first and second mounting blocks comprise:
   a base with bottom and top surfaces, the base having a longitudinally extending body with first and second longitudinal end surfaces, a seam-receiving groove extending upward from the bottom surface toward the top surface and terminating at a location spaced from said top surface, said groove extending through the first and second end surfaces, said groove receiving a respective raised metal seam, said groove dividing said base into first and second opposite side portions connected at the top, said first side portion having at least one hole extending transversely through said first side portion for receiving a set screw, said second side portion being shaped to interlock with said raised metal seam to secure said mounting block to said raised metal seam when said set screw is tightened against said seam,
   said first and second longitudinal end surfaces defining respective grooves, said grooves being positioned perpendicular to said seam receiving groove and positioned above the top of said raised seam,
   said snow rail further comprises a longitudinal groove that is configured to interlock with said grooves on said first and second end surfaces of said base to connect said snow rail to said first and second mounting blocks, and means on said system for mounting another device.

2. The snow brake and mounting system of claim 1, wherein said grooves in said first and second end surfaces define a T-shaped cross section in said base when viewed along said longitudinal axis.

3. The snow brake and mounting system of claim 1, wherein said longitudinal groove on said snow rail defines a C-shaped cross-section in said snow rail when viewed along said longitudinal direction.

4. The snow brake and mounting system of claim 3, wherein said T-shaped cross section in said base is interlocked with said C-shaped cross section in said snow rail.

5. The snow brake and mounting system of claim 1, wherein a snow flag element is mounted on a portion of said snow rail, said snow flag extending below the top of and between adjacent raised metal seams.

6. The snow brake and mounting system of claim 5, wherein said snow flag has a T-shaped cross section when viewed along its longitudinal axis, and said T-shaped cross section is interlocked with a C-shaped cross section in said snow rail.

7. The snow brake and mounting system of claim 4 or 5 wherein said snow rail and said snow flag are made of extruded metal and said means for mounting another device is defined by an opening through said snow rail or said snow flag, or both.

8. The snow brake and mounting system of claim 1 or 3 wherein said snow rail has a generally L-shaped cross section and the leg of the L defines a C-shaped cross section when said snow rail is viewed along said longitudinal direction.

9. The snow brake and mounting system of claim 6, wherein the vertical portion of the T-shaped cross section of said snow flag extends downwardly from the bottom of said snow rail and said snow flag has a length that substantially extends along the entire distance between adjacent raised metal seams.

10. The snow brake and mounting system of claim 1, wherein said system has a snow rail of a length to extend across many raised metal seams in said metal roof.

11. A system for mounting a solar panel on metal roofs having parallel raised metal seams, said system having:
   a first mounting block attached to a first raised metal seam,
   a second mounting block attached to a second raised metal seam located in a spaced relationship to said first seam,
   a rail with one portion connected to said first mounting block and another portion connected to said second mounting block, the improvement wherein:
   said first and second mounting blocks comprise:
   a base with bottom and top surfaces, the base having a longitudinally extending body with first and second longitudinal end surfaces, a seam-receiving groove extending upward from the bottom surface toward the top surface and terminating at a location spaced from said top surface, said groove extending through the first and second end surfaces, said groove receiving a respective raised metal seam, said groove dividing said base into first and second opposite side portions connected at the top, said first side portion having at least one hole extending transversely through said first side portion for receiving a set screw, said second side portion being shaped to interlock with said raised metal seam to secure said mounting block to said raised metal seam when said set screw is tightened against said seam,
   said first and second longitudinal end surfaces defining respective grooves, said grooves being positioned perpendicular to said seam receiving groove and positioned above the top of said raised seam, said first and second side surfaces defining respective grooves, said grooves being positioned parallel to said seam receiving groove,
   said rail further comprises a longitudinal groove that is configured to interlock with said grooves on said first and second end surfaces or said grooves on said first and second side surfaces of said base to connect said rail to said first and second mounting blocks,
   means connected to said system for mounting other devices, and said solar panel connected to said means for mounting.

12. The method of assembling the snow brake and mounting system defined in claim 1, comprising the steps of
   securing a plurality of mounting blocks to respective raised metal seams of said metal roof, said blocks being aligned along a common axis that runs perpendicular to said raised seams,
   sliding the longitudinal groove of said snow rail onto the top of a first mounting block whereby said groove interlocks with said grooves on said first mounting block, and
   further sliding said snow rail onto the top of additional mounting blocks until said snow rail is interconnected to said plurality of mounting blocks.

13. The method of assembling the snow brake and mounting system defined in claim 5, comprising the steps of:
   a. securing a plurality of mounting blocks to respective raised metal seams of said metal roof, said blocks being aligned along a common axis that runs perpendicular to said raised seams,
   b. sliding the longitudinal groove of said snow rail onto the top of a first mounting block whereby said groove interlocks with said grooves in said first mounting block,
   c. sliding the longitudinal groove of said snow rail onto a portion of a snow flag which is positioned to extend between said first mounting block and a second mounting block,
   d. thereafter sliding said snow rail onto the top of said adjacent mounting block,
   e. thereafter repeating steps c. and d. for additional mounting blocks, whereby the assembly includes a plurality of mounting blocks, a plurality of snow flags and said snow rail, and
   f. thereafter attaching another device to said system by said means on said system for mounting another device.

14. The method of claim 13 wherein said another device is a solar panel.

* * * * *